Figure 1:
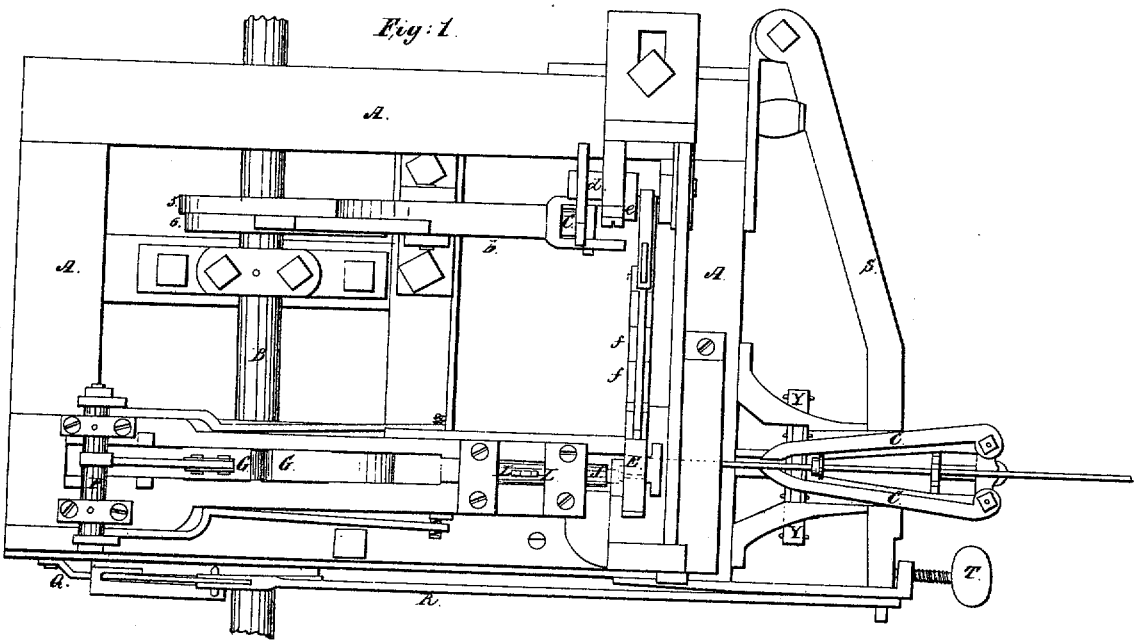

No Printed Specification Available

Sheet 1, 2 Sheets.

T. W. Harvey.

7629X

Making Rivets.

Patented Jun. 29, 1833.

THE GRAPHIC CO. PHOTO-LITH. 39 & 41 PARK PLACE, N.Y.

7629X.

T. W. Harvey.

Making Rivets.

Patented Jun. 29, 1833.

THE GRAPHIC CO. PHOTO-LITH. 39 & 41 PARK PLACE, N.Y.

6/24/1833 1624X

June 24 1833 93.

Thomas W. Harvey

Letters Patent

The Schedule referred to in these Letters Patent and making part of the same
containing a description in the words of the said Thomas W Harvey himself
of his improvement in the machine for making rivets, heading screws & other
similar purposes To all whom it may concern: Be it known that I, T. W. Harvey have in
vented certain improvements in the machinery for making rivets for Steam
Engine Boilers and for other purposes, and which is also applicable to the heading
of wood screws, bolts and other articles upon which heads are to be formed
by pressure. And I do hereby declare that the following is a full and ex
act description thereof — In the accompanying drawings AA represents
the frame of the machine. The shaft B is that to which the driving power
is applied and which operates by means of arms on the other parts of the ma
chine, there being six cams for purposes to be presently described.
The wire or rod upon which the head is to be formed is fed into the machine
by the feeding grab C.C. which are represented as holding it: the wire or
rod passes thro' the head D and is seized and held fast in the shears EE
working on a joint at top. When firmly embraced between these the head
[illegible] die is made to advance upon the portion which projects within the
shears and thus form the head. The cutting off the shank of the rivet is
effected by the vibration of the shears, a lateral motion being given to them
for that purpose. Upon the inner side of the head D there is a steel
plate through which the wire or rod passes, which plate constitutes one
part of the cutter. The dies in the shears are of such thickness as corres
ponds with the length of the shank of the rivel, and as soon as the
head is formed by the heading die and becomes released, the shears vibrate
and cut off the wire by their action, or rather by that of the dies against
the before named steel plate. The action of the cams respectively is as
follows. Cams 1 to 6 in the drawing which under the arrangement represen
ted stands the third upon the shaft B serves to straighten the toggle joints

Figure 2:
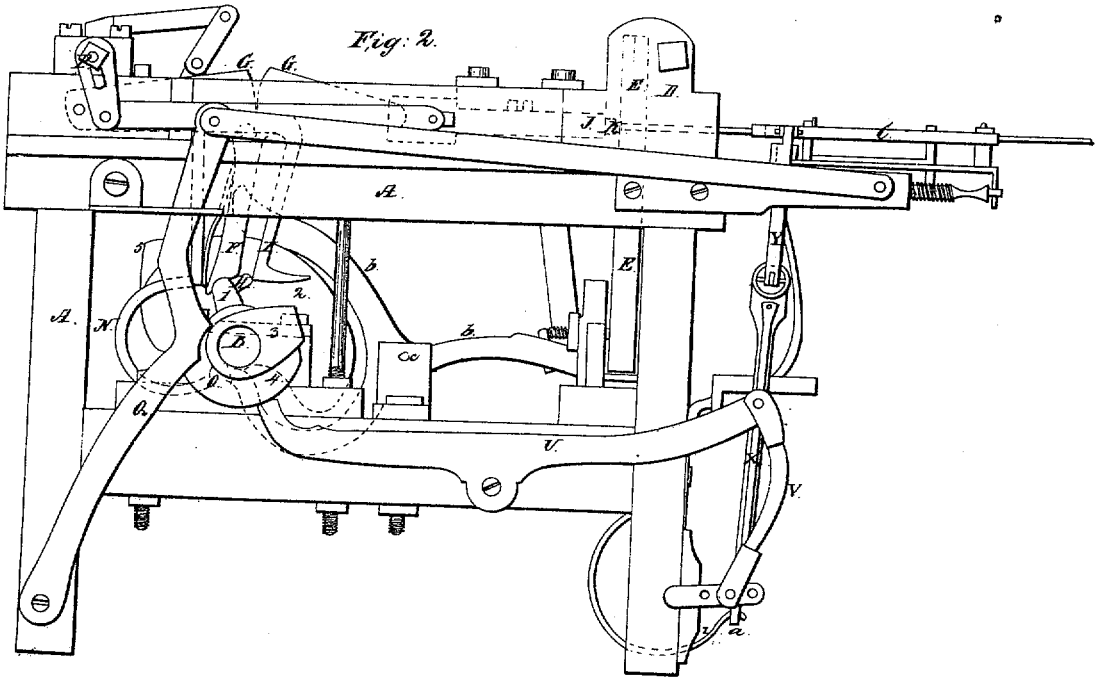
Figure 3:
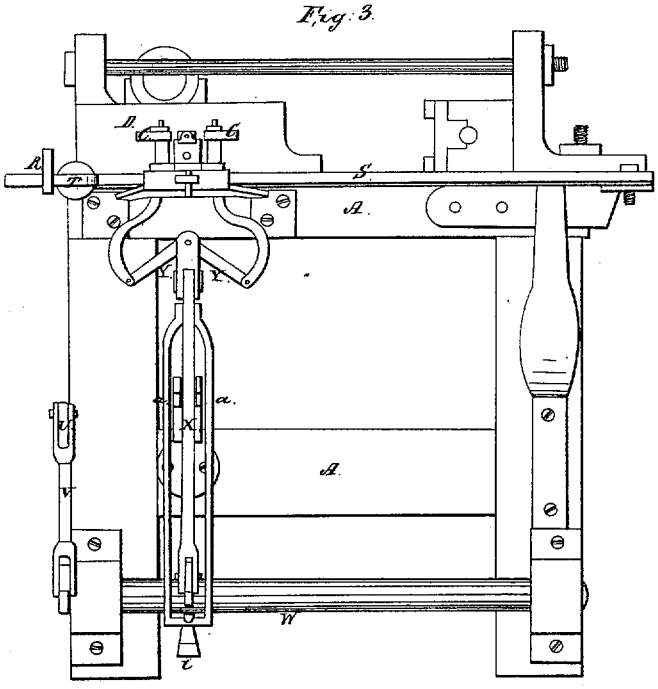

1629X by which the heading die is forced forward. this it effects by acting upon the moving piece F which is attached by a pivot or joint to the main toggle joint GG. the greater part of which as seen in fig 2. is represented by dotted lines as in the actual machine it is hidden by other parts. Upon this cam (No 1) I usually form a tongue which falls into a slot made to receive it in the movable piece E. The tongue is seen at H fig 2 & serves by touching against the piece I. to keep the cam in its place whilst its action is required. the socket J of the heading die works thru suitable slides. the die K being [illegible] keyed in with double keys LL. but it may sometimes be merely dropped into its place. The cam No 2. which is the fourth upon the shaft B. serves to bring the toggle joint GG back which it does by acting upon the cam lever N which has on its lower end a round pin O against which the cam wipes. the upper end of the lever is attached to one of the arms of the main toggle joint. The socket of the heading die may be connected to the toggle joint and retracted in various ways. I have sometimes done this in the way shown in the drawing by the aid of the small shaft P. and the levers and slides connected with it. which are acted upon by the motion of the main toggle joint. but as every competent workman can devise means of doing this I do not intend in general to follow this arrangement I shall not here particularize it. Cam No 3 acts against the lever Q which draws back the rod R and with it the feeding grabs CC. These grabs are attached to the lever S by their under sides and by means of the screw T the feeding is regulated with the utmost precision. Cam No 4 acts upon the lever U this connects at one end by means of a joint to the rod V. which by another joint at its opposite end turns the roller W Fig 3 which is a front view of the machine. This roller elevates and depresses the jointed rod X which when drawn down straight [illegible] the levers YY. and closes the grabbing jaws. the elevation of these levers serving to open them. Z is a spring which bearing upon the stirrup a.a. draws the levers YY down when the cam which elevates them is not in action. Cams 5 & 6 serve to elevate and depress the levers bbb. Figs 1. 2 whose fulcrum is at c the two arched ends of the lever being

1629X

Figure 4:
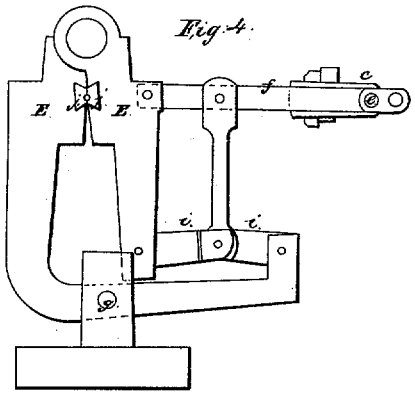

[illegible] by these cams respectively. from the lever b a pitman [illegible] towards
c. fig 1. connected with with the shaft d on which also there is a crank
e which works the rod or bar backwards and forwards & in so doing vibrates
the shears E in a way which may be distinctly seen in fig 4. g being
the pivot on which the vibration takes place and which serves to cut off
the wire or rod as before described. The jointed roll h. by the vibra
tion of the bar f opens and closes the jaws of the shears. this it effects
by means of the toggle joints i i as will be obvious from inspection of
the drawing. j j are the dies which [illegible] the rod. The machine
will of course vary in size according to the nature of the work it is inten
ded to perform. In the annexed drawings it is shown of one half
the actual size of the smallest machine which I contemplate making for
rivets. For one adapted to rivets for steam boilers and similar objects
I make a frame six feet long, four feet wide and three feet ten inches
high. one main toggle joint being three feet long, and vibrating ver
tically six and a half inches giving a slide of one inch & a half to
the heading die. The shears I make to vibrate two and a half inches
In the foregoing description I have followed the arrangement made
in the parts of a machine which I have actually constructed. I have
a have made others which operate upon the same principle & are in fact
substantially the same altho differing from it in minor points of mere
detail. The number of cams upon the main shaft may be increased
or diminished, and the form & direction of the levers upon which they
operate may be indefinitely varied whilst the machine remains [illegible]
tially the same. Most of the operating parts which I have
described and represented are not when taken individually new
but I have so combined them as to give the whole a peculiar character
& to produce and effect which is new and ~~most~~ useful. (It is therefore)
upon the general arrangement and combination of the parts by which
this machine is distinguished from all others which have been construc
ted for similar purposes, that I found my claim to a patent in the
individual parts. however I claim the particular construction of
the cam No 1 as described and represented. I also claim the arrange 1629x ment of the toggle joint by which the shears are opened and closed. by the vibration of the bar marked f in the drawing. Having thus given a full description of my said machine. and having pointed out what I particularly claim as new therein: agreeably to the requirements of the law in such case made and provided. I will now add for the information of those who may construct & use the same, that as in the making of the larger kind of rivets the rods must be heated [illegible] provision should be made for allowing water to run upon the dies to protect them from being softened Exd. Witnesses Thomas W. Harvey.

Wm C [illegible] Jones

Jn. Andrews

[illegible] (1458 words)